United States Patent
Yagasaki et al.

(10) Patent No.: US 9,534,685 B2
(45) Date of Patent: Jan. 3, 2017

(54) CONTROL DEVICE FOR STEPLESS TRANSMISSION

(71) Applicant: HONDA MOTOR CO., LTD., Tokyo (JP)

(72) Inventors: Toru Yagasaki, Saitama (JP); Ryohta Aoki, Saitama (JP); Ryo Katayama, Saitama (JP); Ukyo Ogata, Saitama (JP); Hideaki Aoyama, Saitama (JP); Yuichiro Takemori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 14/443,709

(22) PCT Filed: Nov. 22, 2013

(86) PCT No.: PCT/JP2013/081533
§ 371 (c)(1),
(2) Date: May 19, 2015

(87) PCT Pub. No.: WO2014/125695
PCT Pub. Date: Aug. 21, 2014

(65) Prior Publication Data
US 2016/0017993 A1    Jan. 21, 2016

(30) Foreign Application Priority Data
Feb. 13, 2013  (JP) ................................. 2013-026121

(51) Int. Cl.
*F16H 61/662* (2006.01)
*F16H 61/02* (2006.01)
(Continued)

(52) U.S. Cl.
CPC ........ *F16H 61/66272* (2013.01); *F16H 9/125* (2013.01); *F16H 2061/66277* (2013.01)

(58) Field of Classification Search
CPC ................ F16H 61/66272; F16H 61/02; F16H 2061/66277; F16H 2061/66209; F16H 2061/6607; F16H 2007/0882; F16H 9/125
See application file for complete search history.

(56) References Cited

U.S. PATENT DOCUMENTS

| | | | |
|---|---|---|---|
| 6,460,398 B1 * | 10/2002 | Stopp | F16H 59/46 474/18 |
| 2010/0125396 A1 * | 5/2010 | Hsu | F16H 61/0031 701/55 |
| 2011/0230285 A1 * | 9/2011 | Hinami | F16H 61/0021 474/28 |

FOREIGN PATENT DOCUMENTS

| JP | 2001-012593 A | 1/2001 |
|---|---|---|
| JP | 2007-224992 A | 9/2007 |

(Continued)

OTHER PUBLICATIONS

International Search Report dated Jan. 14, 2014 corresponding to International Patent Application No. PCT/JP2013/081533 and English translation thereof.

*Primary Examiner* — Jacob S Scott
*Assistant Examiner* — Tinh Dang
(74) *Attorney, Agent, or Firm* — Squire Patton Boggs (US) LLP

(57) ABSTRACT

A control device includes: a clamping force determination unit that determines a clamping force Fs so that a transmission gear ratio R of a stepless transmission is a target transmission gear ratio; a correction unit that corrects the clamping force Fs determined by the clamping force determination unit, based on an oil temperature TO of a lubricant interposed between each of pulleys and a belt and the transmission gear ratio R; and a clamping force control unit that controls clamping of the pulleys and to be performed with the clamping force Fs corrected by the correction unit.

4 Claims, 8 Drawing Sheets

(51) Int. Cl.
  *F16H 61/66*  (2006.01)
  *F16H 7/08*  (2006.01)
  *F16H 9/12*  (2006.01)

(56) References Cited

FOREIGN PATENT DOCUMENTS

JP  2007224992 A  *  9/2007  ............... F16H 9/10
JP  2007-292238 A  11/2007

* cited by examiner

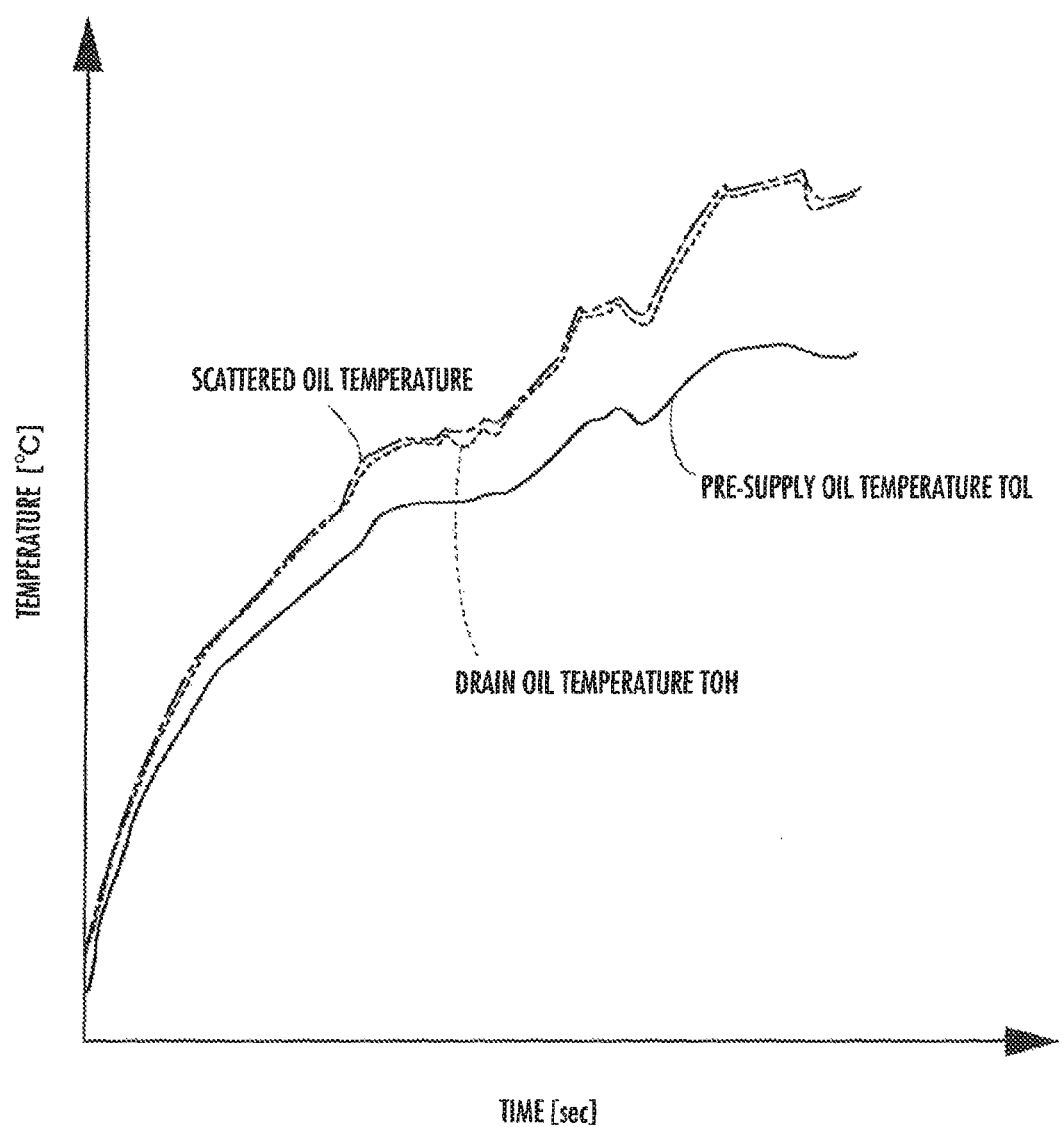

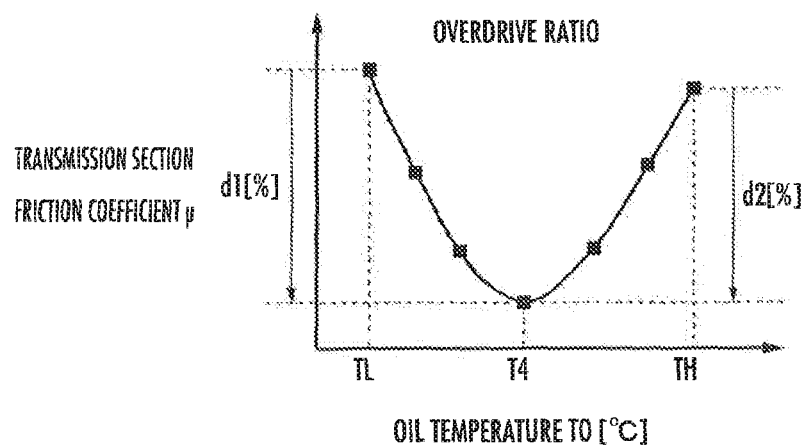
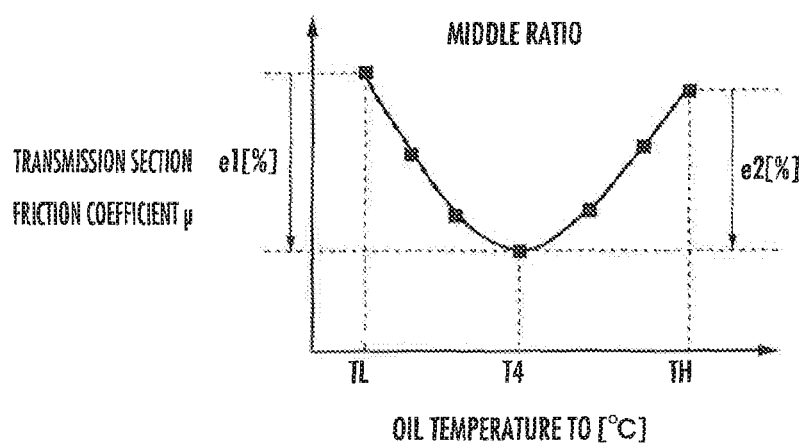
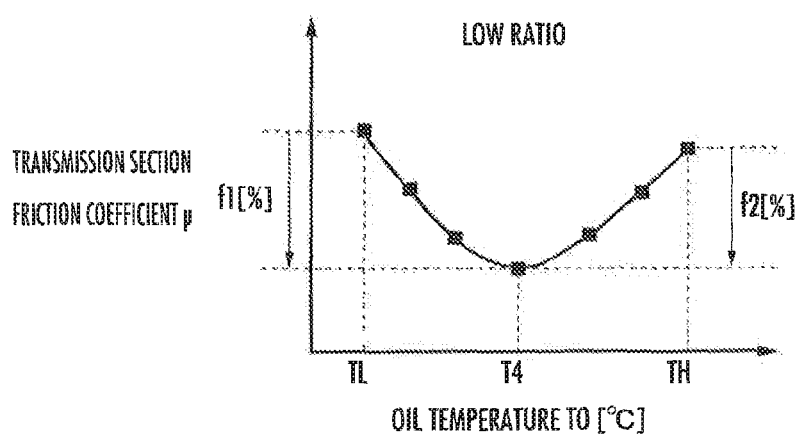

CONTROL DEVICE FOR STEPLESS TRANSMISSION

TECHNICAL FIELD

The present invention relates to a control device for a stepless transmission.

BACKGROUND ART

A conventionally known control device for a stepless transmission (a continuously variable transmission) includes: an input-side element configured to receive power from a power source of a vehicle; an output-side element configured to output the power to the drive wheels of the vehicle; and a transmission element configured to transmit the power from the input-side element to the output-side element (for example, see Patent Literature 1). The control device for the stepless transmission determines the clamping force of the input-side element and the output-side element so that the transmission gear ratio of the stepless transmission is a target transmission gear ratio which is the target value of the stepless transmission.

Such a stepless transmission is required to have no significant slippage between each of the input-side element and the output-side element and the transmission element, to efficiently transmit power from the input-side element to the output-side element. The friction coefficient between each of the input-side element and the output-side element and the transmission element changes depending on the temperature of a lubricant interposed between each of the input-side element and the output-side element and the transmission element. Hence, the control device for the stepless transmission corrects the clamping force of the input-side element and output-side element according to the temperature of the lubricant.

CITATION LIST

Patent Literature

Patent Literature 1: Japanese Patent Application Laid-open No. 2007-224992

SUMMARY OF INVENTION

Technical Problem

Since the lubricant is supplied between each of the input-side element and the output-side element and the transmission element, the temperature of the lubricant increases due to friction between each of the input-side element and the output-side element and the transmission element. This causes the measurement result of the temperature of the lubricant to differ depending on the measurement location. To prevent a decrease in power transmission efficiency from the input-side element to the output-side element, the clamping force needs to be appropriately corrected according to the friction property of the lubricant and the measurement method of the temperature of the lubricant.

In Patent Literature 1, however, the difference of the temperature of the lubricant depending on the measurement location is not disclosed. There is thus a possibility that the clamping force is not appropriately corrected, causing a decrease in power transmission efficiency from the input-side element to the output-side element.

The present invention has been made in view of above, and has an object of providing a control device for a stepless transmission that enables efficient power transmission from an input-side element to an output-side element.

Solution to Problem

The present invention is a control device for a stepless transmission that includes: an input-side element configured to receive power from a power source of a vehicle; an output-side element configured to output the power to a drive wheel of the vehicle; and a transmission element configured to transmit the power from the input-side element to the output-side element, wherein the power is transmitted between each of the input-side element and the output-side element and the transmission element with a lubricant being interposed between each of the input-side element and the output-side element and the transmission element, and a transmission gear ratio is adjusted according to a clamping force of the input-side element and the output-side element for the transmission element, the control device including: a clamping force determination unit configured to determine the clamping force so that the transmission gear ratio of the stepless transmission is a target transmission gear ratio which is a target value of the stepless transmission; a first oil temperature detection unit configured to detect a temperature of oil before being supplied as the lubricant; a second oil temperature detection unit configured to detect the temperature of the oil that has been supplied as the lubricant and discharged from between each of the input-side element and the output-side element and the transmission element; a lubricant temperature estimation unit configured to estimate a temperature of the lubricant, based on at least one of the temperature detected by the first oil temperature detection unit and the temperature detected by the second oil temperature detection unit; a correction unit configured to correct the clamping force determined by the clamping force determination unit, based on the temperature detected by the first oil temperature detection unit, the temperature detected by the second oil temperature detection unit, and the temperature estimated by the lubricant temperature estimation unit; and a clamping force control unit configured to control clamping of the input-side element and the output-side element to be performed with the clamping force corrected by the correction unit, wherein the lubricant has a property in which a friction coefficient between each of the input-side element and the output-side element and the transmission element is lower when the temperature of the lubricant is closer to a predetermined temperature, and wherein the correction unit is configured to correct the clamping force based on the temperature detected by the second oil temperature detection unit in the case where the temperature estimated by the lubricant temperature estimation unit is lower than the predetermined temperature, and correct the clamping force based on the temperature detected by the first oil temperature detection unit in the case where the temperature estimated by the lubricant temperature estimation unit is higher than the predetermined temperature.

According to the present invention, the temperature of the oil when functioning as the lubricant increases due to friction between each of the input-side element and the output-side element and the transmission element. This means the first oil temperature detection unit detects a temperature lower than the temperature of the oil when functioning as the lubricant, and the second oil temperature detection unit detects a temperature higher than or substantially equal to the temperature of the oil when functioning as the lubricant.

In the case where the temperature of the lubricant (i.e. oil interposed between each of the input-side element and the output-side element and the transmission element to lubricate these elements) estimated by the lubricant temperature estimation unit is lower than the predetermined temperature, the correction unit corrects the clamping force using the detection result of the higher oil temperature, that is, the detection result of the second oil temperature detection unit. In the case where the temperature of the lubricant estimated by the lubricant temperature estimation unit is higher than the predetermined temperature, the correction unit corrects the clamping force using the detection result of the lower oil temperature, that is, the detection result of the first oil temperature detection unit.

Thus, the correction unit uses the oil temperature closer to the predetermined temperature at which the friction coefficient between each of the input-side element and the output-side element and the transmission element decreases, as the temperature of the lubricant used to correct the clamping force. This enables efficient power transmission from the input-side element to the output-side element.

In the present invention, the correction unit is preferably configured to correct the clamping force to be larger when the temperature based on which the clamping force is corrected is closer to the predetermined temperature. In the case of using such a lubricant whose friction coefficient between each of the input-side element and the output-side element and the transmission element is smaller when the temperature (which is the temperature detected by the second oil temperature detection unit in the case where the temperature estimated by the lubricant temperature estimation unit is lower than the predetermined temperature, and the temperature detected by the first oil temperature detection unit in the case where the temperature estimated by the lubricant temperature estimation unit is higher than the predetermined temperature) based on which the clamping force is corrected is closer to the predetermined temperature, the friction coefficient between each of the input-side element and the output-side element and the transmission element is smaller when the temperature based on which the clamping force is corrected is closer to the predetermined temperature. In such a case, the correction unit corrects the clamping force to be larger, so that power can be efficiently transmitted from the input-side element to the output-side element.

In the present invention, the control device preferably includes a transmission gear ratio detection unit configured to detect the transmission gear ratio of the stepless transmission, wherein the correction unit is configured to correct the clamping force to be larger when the transmission gear ratio detected by the transmission gear ratio detection unit is smaller. In the case where the friction coefficient between each of the input-side element and the output-side element and the transmission element is smaller when the transmission gear ratio detected by the transmission gear ratio detection unit is smaller, the correction unit corrects the clamping force to be larger, so that power can be efficiently transmitted from the input-side element to the output-side element.

BRIEF DESCRIPTION OF DRAWINGS

FIG. 2 is a diagram illustrating the temporal changes of the temperature of oil before being supplied between input-side pulleys or output-side pulleys and a belt and the temperature of the oil after being discharged.

FIGS. 3A to 3C are diagrams illustrating the relationship between the temperature of oil (oil temperature) and the friction coefficient (transmission section friction coefficient) between each of the input-side pulleys and the output-side pulleys and the belt in the case where predetermined oil is used, wherein FIG. 3A illustrates the relationship between the oil temperature and the transmission section friction coefficient when the transmission gear ratio of the stepless transmission is an overdrive ratio, FIG. 3B illustrates the relationship between the oil temperature and the transmission section friction coefficient when the transmission gear ratio of the stepless transmission is a middle ratio, and FIG. 3C illustrates the relationship between the oil temperature and the transmission section friction coefficient when the transmission gear ratio of the stepless transmission is a low ratio.

FIGS. 5A to 5C are diagrams illustrating the relationship between the oil temperature and the transmission section friction coefficient in the case where oil in the embodiment is used, wherein FIG. 5A illustrates the relationship between the oil temperature and the transmission section friction coefficient when the transmission gear ratio of the stepless transmission is the overdrive ratio, FIG. 5B illustrates the relationship between the oil temperature and the transmission section friction coefficient when the transmission gear ratio of the stepless transmission is the middle ratio, and FIG. 5C illustrates the relationship between the oil temperature and the transmission section friction coefficient when the transmission gear ratio of the stepless transmission is the low ratio.

DESCRIPTION OF EMBODIMENTS

Figure 1:
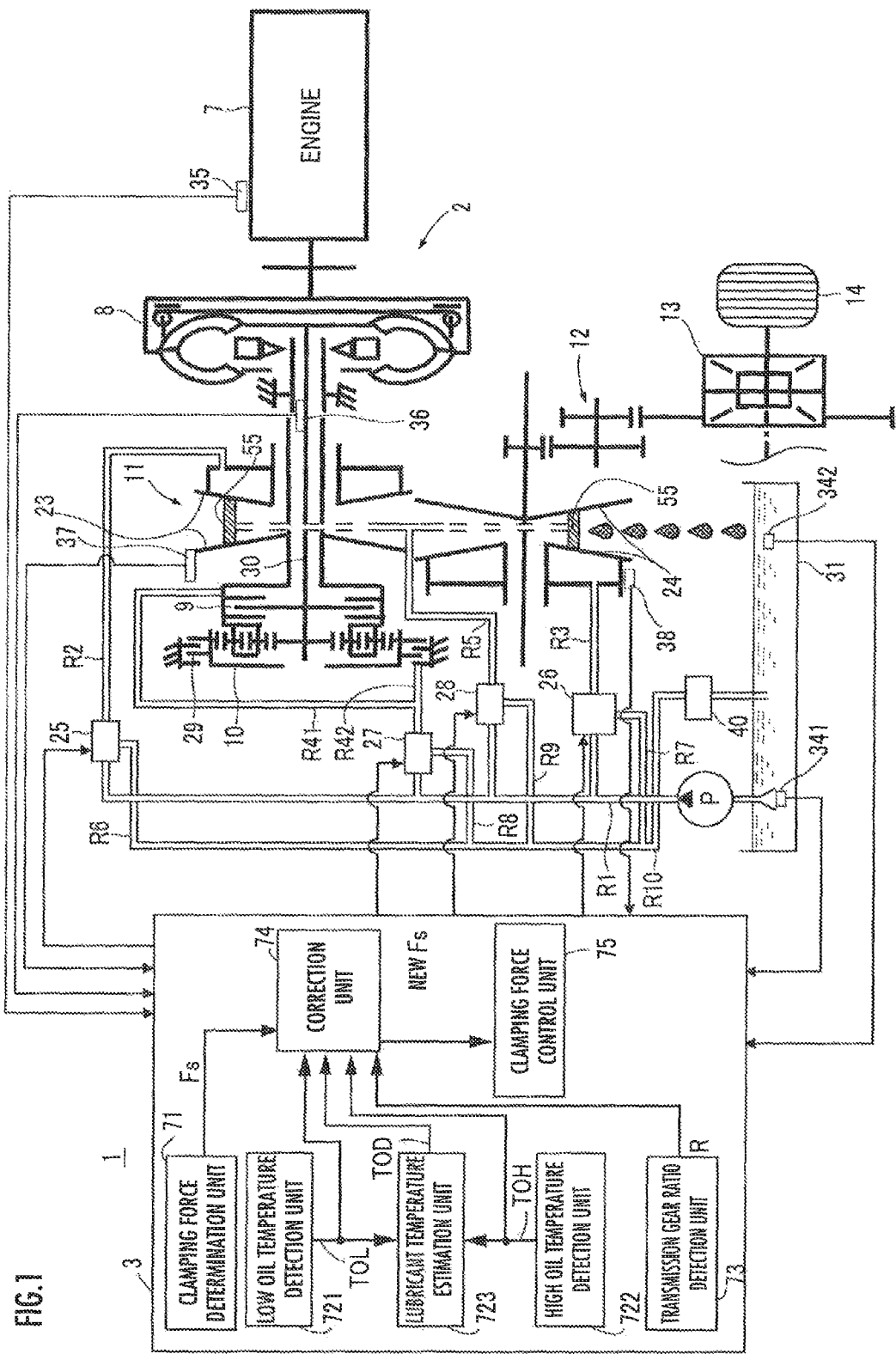
FIG. 1 is a diagram of a stepless transmission and its control device in an embodiment of the present invention.

In FIG. 1, a vehicle (automobile) 1 includes a power transmission device 2 and a control device 3. The power transmission device 2 transmits power from an engine 7 to right and left drive wheels 14. The power transmission device 2 includes a fluid type torque converter 8, a forward clutch 9, a forward-reverse switching device 10, a stepless transmission 11, a parallel axis gear device 12, and a differential device 13, in the direction of power transmission from the engine 7 to the drive wheels 14. The power transmission device 2 includes bearings (not illustrated) for rotatably supporting the shafts in the power transmission device 2.

The stepless transmission 11 mainly includes a pair of input-side pulleys 23, a pair of output-side pulleys 24, a belt 55, an input-side oil pressure adjustment device 25, and an output-side oil pressure adjustment device 26.

The pair of input-side pulleys 23 are made up of a pulley (movable pulley) movable along an input shaft and a fixed pulley. The input-side oil pressure adjustment device 25 controls the lateral pressure of the movable input-side pulley 23 using oil supplied from an oil tank 31, to adjust the clamping force Fsp of the belt 55 between the pair of input-side pulleys 23. The pair of output-side pulleys 24 are made up of a pulley (movable pulley) movable along an output shaft and a fixed pulley. The output-side oil pressure adjustment device 26 controls the lateral pressure of the movable output-side pulley 24 using the oil supplied from the oil tank 31, to adjust the clamping force Fss of the belt 55 between the pair of output-side pulleys 24. The clamping force Fsp in the input-side pulleys 23 and the clamping force Fss in the output-side pulleys 24 are hereafter both referred to as "clamping force Fs" for the sake of convenience.

The oil in the oil tank 31 is supplied, by an oil pump P, between the input-side pulleys 23 or the output-side pulleys 24 and the belt 55 to form an oil film between the input-side pulleys 23 or the output-side pulleys 24 and the belt 55. Thus, the oil in the oil tank 31 also functions as a lubricant for lubrication between the input-side pulleys 23 or the output-side pulleys 24 and the belt 55.

In the input-side pulleys 23 and the output-side pulleys 24, the lateral pressure is the pressure for pressing the movable input-side pulley 23 and output-side pulley 24 toward the fixed input-side pulley 23 and output-side pulley 24 along the axial directions of the input shaft and output shaft, respectively. As the lateral pressure increases and the clamping force Fs increases, the winding radius of the belt 55 in the input-side pulleys 23 or the output-side pulleys 24 increases. The transmission gear ratio of the stepless transmission 11 is controlled by controlling the lateral pressure (or the clamping force Fs) in the input-side pulleys 23 and the output-side pulleys 24.

An intermediate shaft 30 passes through a center hole of each input-side pulley 23 along its center line, and has respective ends fixed to a turbine runner as an output portion of the fluid type torque converter 8 and a sun gear as an input portion of the forward-reverse switching device 10.

The forward clutch 9 is positioned between the intermediate shaft 30 and the input-side pulleys 23. In the case where a shift lever (not illustrated) is in a forward range such as D (drive) range or S (sports) range, the forward clutch 9 is in a connected state. In the case where the shift lever is in a stop range such as N (neutral) range or P (parking) range or in a reverse range such as R (reverse) range, the forward clutch 9 is in a disconnected state.

A brake 29 is positioned between a ring gear of the forward-reverse switching device 10 and a predetermined fixed member outside the forward-reverse switching device 10, and switches the ring gear between a fixed state and a released state by its oil pressure being controlled by a clutch/brake oil pressure adjustment device 27. In the case where the shift lever is in R range, the brake 29 fixes the ring gear, to reverse the rotation direction and transmit the power of the intermediate shaft 30 to the input-side pulleys 23. In the case where the shift lever is in a range other than R range, the brake 29 releases the ring gear to stop power transmission.

The ring gear in the forward-reverse switching device 10 rotates in the same direction as the intermediate shaft 30 when the forward clutch 9 is in a connected state (i.e. in-gear), and rotates in the opposite direction to the intermediate shaft 30 when the forward clutch 9 is in a disconnected state and the brake of the forward-reverse switching device 10 is in a disconnected state (i.e. out-gear). In in-gear, the output shaft of the engine 7 and the drive wheels 14 are in a power connection state. In out-gear, the output shaft of the engine 7 and the drive wheels 14 are in a power disconnection state.

Each path (hereafter referred to as "supply path") of the oil supplied from the oil tank 31 is described below.

The oil in the oil tank 31 is mainly supplied as appropriate for the purposes such as the operation of the input-side pulleys 23, the operation of the output-side pulley 24, the lubrication between each of the input-side pulleys 23 and the output-side pulleys 24 and the belt 55, and the operation of the brake 29.

When operating the input-side pulleys 23, the oil is supplied to the movable input-side pulley 23 through a path "R1→R2" by the input-side oil pressure adjustment device 25. Excess oil of the oil pressure adjusted by the input-side oil pressure adjustment device 25 passes through a path "R6→R10", is cooled by an oil cooler 40, and then returns to the oil tank 31.

When operating the output-side pulleys 24, the oil is supplied to the movable output-side pulley 24 through a path "R1→R3" by the output-side oil pressure adjustment device 26. Excess oil of the oil pressure adjusted by the output-side oil pressure adjustment device 26 passes through a path "R7→R10", is cooled by the oil cooler 40, and then returns to the oil tank 31.

The oil used for lubrication between each of the input-side pulleys 23 and the output-side pulleys 24 and the belt 55 is sprayed between each of the input-side pulleys 23 and the output-side pulleys 24 and the belt 55 through a path "R1→R5" by a lubricant adjustment device 28. The sprayed oil (lubricant) scatters in the surroundings due to the motion of the input-side pulleys 23, the output-side pulleys 24, and the belt 55. The scattered oil returns to the oil tank 31 provided in a lower part of the stepless transmission 11. Excess oil of the oil pressure adjusted by the lubricant adjustment device 28 passes through a path "R9→R10", is cooled by the oil cooler 40, and then returns to the oil tank 31.

When operating the forward clutch 9 or the brake 29, a clutch/brake switching device (not illustrated) switches an engaged state between the forward clutch 9 and the brake 29. The oil is supplied to the forward clutch 9 through a path "R1→R41" or to the brake 29 through a path "R1→R42" by the clutch/brake oil pressure adjustment device 27. This increases the operating oil pressure of the forward clutch 9 or brake 29. In the case of releasing the ring gear fixed by the brake 29 or the engaged forward clutch 9, excess oil of the oil pressure adjusted by the clutch/brake oil pressure adjustment device 27 passes through a path "R8→R10", is cooled by the oil cooler 40, and then returns to the oil tank 31.

The control device 3 includes a low oil temperature sensor 341, a high oil temperature sensor 342, an engine speed sensor 35, an intermediate shaft speed sensor 36, an input-side speed sensor 37, and an output-side speed sensor 38. The control device 3 transmits signals to the input-side oil pressure adjustment device 25 and the output-side oil pressure adjustment device 26 based on input signals from the low oil temperature sensor 341, the high oil temperature sensor 342, the engine speed sensor 35, the intermediate shaft speed sensor 36, the input-side speed sensor 37, and the output-side speed sensor 38, to control the lateral pressure of the input-side pulleys 23 and the output-side pulleys 24 and control the clamping force Fs of the belt 55 by the input-side pulleys 23 and the output-side pulleys 24.

The low oil temperature sensor 341 outputs a signal corresponding to the temperature (hereafter referred to as "pre-supply oil temperature") TOL of the oil before being supplied between each of the input-side pulleys 23 and the output-side pulleys 24 and the belt 55. The low oil temperature sensor 341 is placed at a position influenced by the oil cooled by the oil cooler 40.

The high oil temperature sensor 342 is placed at a position where the oil supplied between each of the input-side pulleys 23 and the output-side pulleys 24 and the belt 55 and discharged from between each of the input-side pulleys 23 and the output-side pulleys 24 and the belt 55 drops into the oil tank 31, and outputs a signal corresponding to the temperature (hereafter referred to as "drain oil temperature") TOH of the dropped oil. The high oil temperature sensor 342 is placed in the oil tank 31, at a position less influenced by the oil cooled by the oil cooler 40.

The engine speed sensor 35 detects the rotation speed of the output shaft of the engine 7. The intermediate shaft speed sensor 36 detects the rotation speed of the intermediate shaft 30. The input-side speed sensor 37 detects the rotation speed of the input-side pulleys 23. The output-side speed sensor 38 detects the rotation speed of the output-side pulleys 24.

The following describes the structure of the control device 3.

The control device 3 includes a clamping force determination unit 71, a low oil temperature detection unit (corresponding to the first oil temperature detection unit in the present invention) 721, a high oil temperature detection unit (corresponding to the second oil temperature detection unit in the present invention) 722, a lubricant temperature estimation unit 723, a transmission gear ratio detection unit 73, a correction unit 74, and a clamping force control unit 75.

The clamping force determination unit 71 determines the clamping force Fs so that the transmission gear ratio R of the stepless transmission 11 is a target transmission gear ratio which is the target value of the stepless transmission 11 (corresponding to the process of step ST1 in FIG. 7 described later). For example, the target transmission gear ratio is set depending on the current travel speed and required torque (accelerator pedal operation amount) of the vehicle, etc. A table indicating the relationship between the transmission gear ratio R and the clamping force Fs has been determined beforehand by experiment and the like and stored in a storage device (not illustrated) such as memory. The clamping force determination unit 71 determines the clamping force Fs corresponding to the target transmission gear ratio, with reference to the stored table. Note that the table may be determined in consideration of the torque input to the input-side pulleys 23, etc.

The low oil temperature detection unit 721 detects the pre-supply oil temperature TOL based on the signal output from the low oil temperature sensor 341. In detail, the low oil temperature sensor 341 detects the temperature of the oil (i.e. the temperature of the oil cooled by the oil cooler 40) in the oil tank 31. Accordingly, the pre-supply oil temperature TOL detected by the low oil temperature detection unit 721 is lower than the temperature of the oil when functioning as the lubricant (i.e. the temperature of the lubricant under influence of friction heat caused by friction between each of the input-side pulleys 23 and the output-side pulleys 24 and the belt 55).

The high oil temperature detection unit 722 detects the drain oil temperature TOH based on the signal output from the high oil temperature sensor 342. In detail, since the high oil temperature sensor 342 is less influenced by the oil cooler 40, the drain oil temperature TOH detected by the high oil temperature detection unit 722 is the temperature increased due to friction between each of the input-side pulleys 23 and the output-side pulleys 24 and the belt 55, and is higher than the temperature of the oil when functioning as the lubricant.

The process of the low oil temperature detection unit 721 and high oil temperature detection unit 722 corresponds to the process of step ST2 in FIG. 7 described later.

The pre-supply oil temperature TOL which is the temperature of the oil before being supplied between the input-side pulleys 23 or the output-side pulleys 24 and the belt 55 is lower than the drain oil temperature TOH which is the temperature of the oil after being supplied between the input-side pulleys 23 or the output-side pulleys 24 and the belt 55 (see FIG. 2).

Meanwhile, the temperature of the scattered oil (hereafter referred to as "scattered oil temperature") when the lubricant supplied between the input-side pulleys 23 or the output-side pulleys 24 and the belt 55 scatters in the surroundings due to the motion of the pulleys 23 and 24 and the belt 55 is substantially equal to the drain oil temperature (see FIG. 2). Note that the scattered oil temperature is experimentally detected (for example, the friction heat generated between each of the input-side pulleys 23 and the output-side pulleys 24 and the belt 55 is estimated, and the estimated friction heat is added to the pre-supply oil temperature TOL), without provision of a sensor for directly detecting the scattered oil temperature.

In this embodiment, the oil discharged and passing through the path R10 is cooled by the oil cooler 40 before returning to the oil tank 31. Therefore, the temperature of the oil in the oil tank 31 is, in its supply path, highest at the drain oil temperature and lowest at the pre-supply oil temperature.

The lubricant temperature estimation unit 723 estimates the temperature (hereafter referred to as "estimated oil temperature") TOD of the oil when functioning as the lubricant, based on the pre-supply oil temperature TOL detected by the low oil temperature detection unit 721 and the drain oil temperature TOH detected by the high oil temperature detection unit 722 (for details, see the description of the process of step ST11 in FIG. 8 described later).

The transmission gear ratio detection unit 73 detects the transmission gear ratio R of the stepless transmission 11, based on the output of the input-side speed sensor 37 and the output of the output-side speed sensor 38 (corresponding to the process of step ST3 in FIG. 7 described later). In more detail, the transmission gear ratio detection unit 73 detects the result of dividing the output of the input-side speed sensor 37 by the output of the output-side speed sensor 38, as the transmission gear ratio R.

Figure 7:
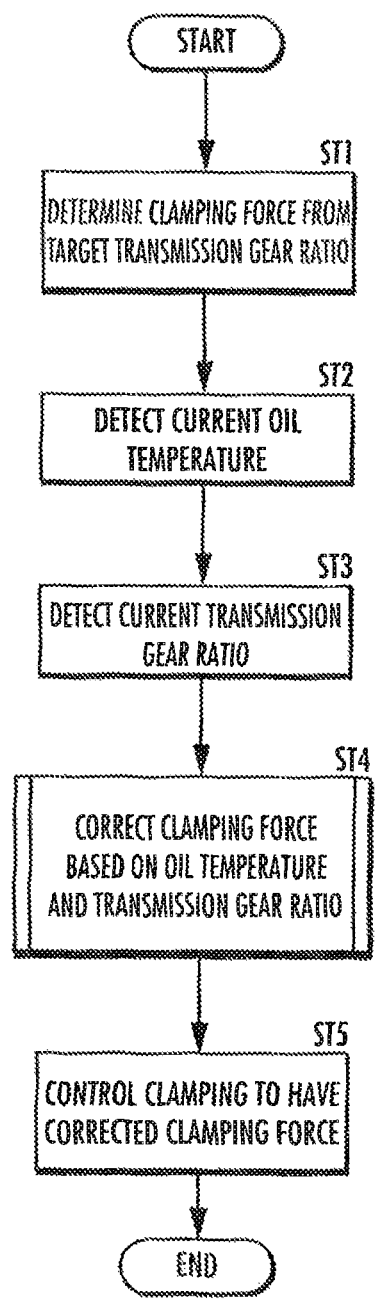
FIG. 7 is a flowchart illustrating an operation procedure executed by the control device in the embodiment.

The correction unit 74 corrects the clamping force Fs determined by the clamping force determination unit 71, based on the pre-supply oil temperature TOL detected by the low oil temperature detection unit 721, the drain oil temperature TOH detected by the high oil temperature detection unit 722, the estimated oil temperature TOD estimated by the lubricant temperature estimation unit 723, and the transmission gear ratio R detected by the transmission gear ratio detection unit 73 (corresponding to the process of step ST4 in FIG. 7 described later).

The clamping force control unit 75 controls the input-side oil pressure adjustment device 25 and the output-side oil pressure adjustment device 26 so that the belt 55 is clamped by the input-side pulleys 23 and the output-side pulleys 24 with the clamping force Fs corrected by the correction unit 74 (corresponding to the process of step ST5 in FIG. 7 described later).

The following describes the correction of the clamping force Fs by the correction unit 74 in more detail.

Figure 3A:
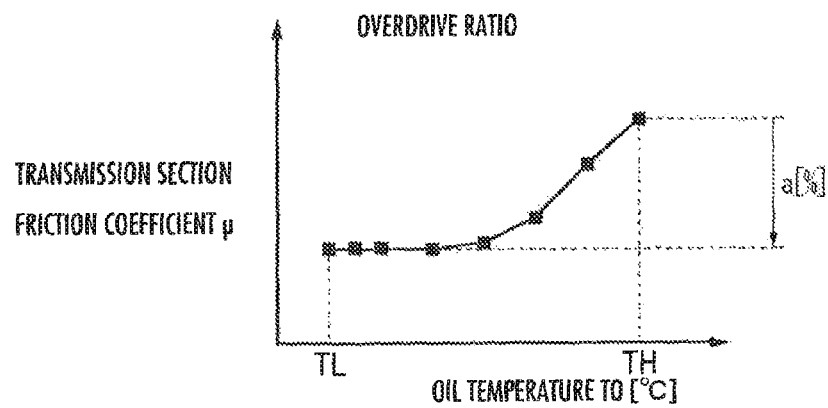
Figure 3B:
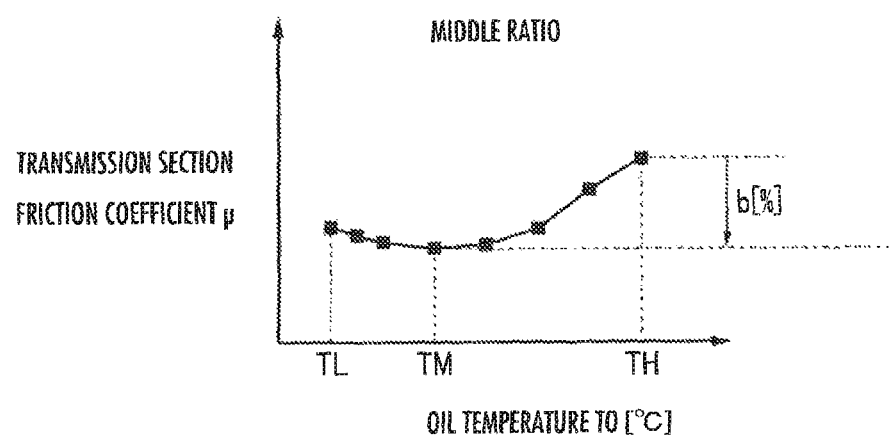
Figure 3C:
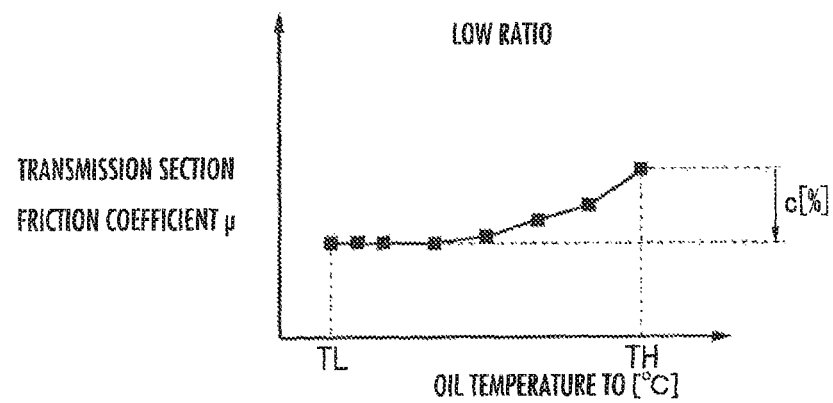

The friction coefficient (hereafter referred to as "transmission section friction coefficient") $\mu$ between the input-side pulleys 23 or the output-side pulleys 24 and the belt 55 changes depending on the temperature (hereafter simply referred to as "oil temperature") TO of the lubricant and the transmission gear ratio R of the stepless transmission 11 (see FIGS. 3A to 3C).

Each graph in FIGS. 3A to 3C illustrates an example of the relationship (hereafter referred to as "oil temperature friction property") between the oil temperature TO and the transmission section friction coefficient $\mu$ when the transmission gear ratio R of the stepless transmission 11 is a predetermined transmission gear ratio.

FIG. 3A illustrates the oil temperature friction property when the transmission gear ratio R of the stepless transmission 11 is an overdrive ratio (minimum transmission gear ratio). FIG. 3B illustrates the oil temperature friction property when the transmission gear ratio R of the stepless transmission 11 is a middle ratio (a transmission gear ratio between the overdrive ratio and a low ratio, an example when the transmission gear ratio is 1 is used here). FIG. 3C illustrates the oil temperature friction property when the transmission gear ratio R of the stepless transmission 11 is the low ratio (maximum transmission gear ratio).

In each graph in FIGS. 3A to 3C, the horizontal axis represents the oil temperature TO (higher toward the right), and the vertical axis represents the transmission section friction coefficient $\mu$ (larger toward the top).

In the overdrive ratio, the oil temperature friction property is such a property in which the transmission section friction coefficient $\mu$ does not increase (or increases slightly) at a predetermined temperature (hereafter referred to as "first temperature") TH or higher, and also the transmission section friction coefficient $\mu$ decreases as the oil temperature TO decreases and, once the oil temperature TO has decreased to some extent, is unchanged (or decreases slightly) at a predetermined temperature (hereafter referred to as "second temperature", where the second temperature TL is lower than the first temperature TH) TL or lower (see FIG. 3A). Such a property is hereafter referred to as a first property.

In the overdrive ratio, in the range from the second temperature TL to the first temperature TH, the minimum transmission section friction coefficient $\mu$ (the transmission section friction coefficient $\mu$ at the second temperature TL) is a[%] lower than the maximum transmission section friction coefficient $\mu$ (the transmission section friction coefficient $\mu$ at the first temperature TH).

In the middle ratio, the oil temperature friction property is such a property in which the transmission section friction coefficient $\mu$ does not increase (or increases slightly) at the first temperature TH or higher, and also the transmission section friction coefficient $\mu$ decreases as the oil temperature TO decreases and, once the oil temperature TO has decreased to some extent, increases slightly at a predetermined temperature (hereafter referred to as "third temperature", where the third temperature TM is lower than the first temperature TH) TM or lower until the second temperature TL lower than the third temperature TM is reached (see FIG. 3B). Such a property is hereafter referred to as a second property.

In the middle ratio, in the range from the second temperature to the first temperature, the minimum transmission section friction coefficient $\mu$ (the transmission section friction coefficient $\mu$ at the third temperature TM) is b[%] lower than the maximum transmission section friction coefficient $\mu$ (the transmission section friction coefficient $\mu$ at the first temperature TH) (where a>b).

In the low ratio, the oil temperature friction property is the first property as in the overdrive ratio (see FIG. 3C). In the low ratio, in the range from the second temperature to the first temperature, the minimum transmission section friction coefficient $\mu$ (the transmission section friction coefficient $\mu$ at the second temperature TL) is c[%] lower than the maximum transmission section friction coefficient $\mu$ (the transmission section friction coefficient $\mu$ at the first temperature TH) (where b>c).

Thus, in the case where the oil having the above-mentioned property is used, the rate of change (hereafter referred to as "friction coefficient change rate") of the minimum transmission section friction coefficient $\mu$ with respect to the maximum transmission section friction coefficient $\mu$ is lower when the transmission gear ratio R is larger (overdrive ratio→middle ratio→low ratio).

In the case where the oil having the above-mentioned property is used, the transmission section friction coefficient $\mu$ needs to be greater than or equal to a predetermined friction coefficient (such a friction coefficient that enables sufficient power transmission from the input-side pulleys 23 to the output-side pulleys 24), in order to prevent a decrease in power transmission efficiency from the input-side pulleys 23 to the output-side pulleys 24. Hence, the amount of correction needs to be larger so that the clamping force Fs is larger when the friction coefficient change rate is higher.

Figure 4A:
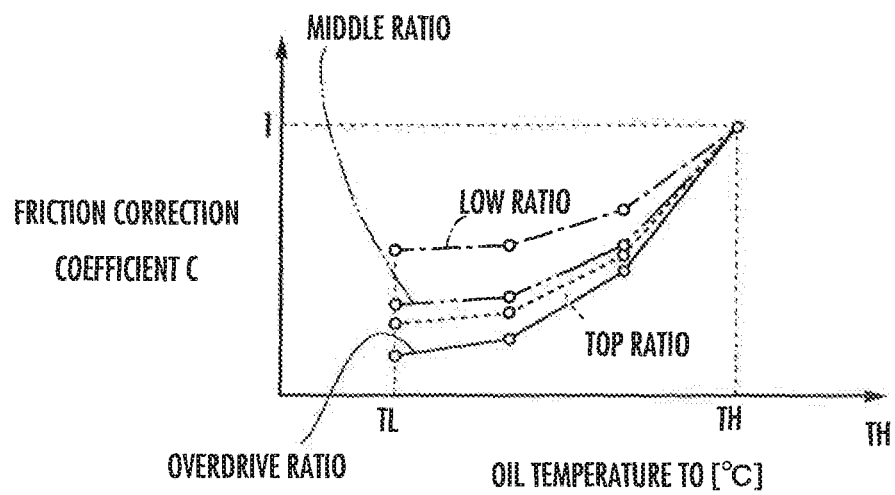
FIG. 4A is a diagram illustrating the relationship between the oil temperature and the friction correction coefficient when the transmission gear ratio of the stepless transmission is the overdrive ratio, a top ratio, the middle ratio, and the low ratio in the case where the oil having the property illustrated in FIGS. 3A to 3C is used.

In detail, a smaller friction correction coefficient C (the friction correction coefficient C is a coefficient for correcting the transmission section friction coefficient $\mu$) is set when the transmission section friction coefficient $\mu$ corresponding to the oil temperature TO and the transmission gear ratio R is smaller (see FIG. 4A). FIG. 4A illustrates an example of the relationship between the oil temperature TO and the friction correction coefficient C. In FIG. 4A, the horizontal axis represents the oil temperature TO (higher toward the right), and the vertical axis represents the friction correction coefficient C (larger toward the top). The top ratio in FIG. 4A is a transmission gear ratio between the middle ratio and the overdrive ratio. In FIG. 4A, the oil temperature friction property when the transmission gear ratio R is the top ratio is the first property, though not illustrated.

The friction correction coefficient C corresponding to the first temperature TH is set to "1" (that is, the first temperature TH is a reference temperature). Note that the reference temperature may be set to any temperature as appropriate.

Even when the oil temperature friction property is the second property as in the case where the transmission gear ratio R is the middle ratio, the increase of the transmission section friction coefficient $\mu$ when the oil temperature TO decreases from the third temperature TM to the second temperature TL is not large. Accordingly, the friction correction coefficient C is set with the second property being regarded as substantially the first property.

A reference transmission section friction coefficient $\mu$ is multiplied by the friction correction coefficient C determined according to the oil temperature TO and the transmission gear ratio R, to yield a new transmission section friction coefficient μ. The reference transmission section friction coefficient μ is, for example, determined depending on the torque input to the input-side pulleys 23, etc.

The new transmission section friction coefficient μ is obtained by multiplication by the friction correction coefficient C set in the above-mentioned way, and so is smaller when the transmission section friction coefficient μ estimated according to the oil temperature TO and the target transmission gear ratio is smaller.

The clamping force Fs is then corrected on the assumption that the friction coefficient between each of the input-side pulleys 23 and the output-side pulleys 24 and the belt 55 is the new transmission section friction coefficient μ. Thus, the clamping force Fs is corrected to be larger when the new transmission section friction coefficient μ is smaller (that is, the clamping force Fs is corrected to be larger when the friction correction coefficient C for correcting the transmission section friction coefficient μ is smaller), in order to prevent a decrease in power transmission efficiency from the input-side pulleys 23 to the output-side pulleys 24.

Figure 4B:
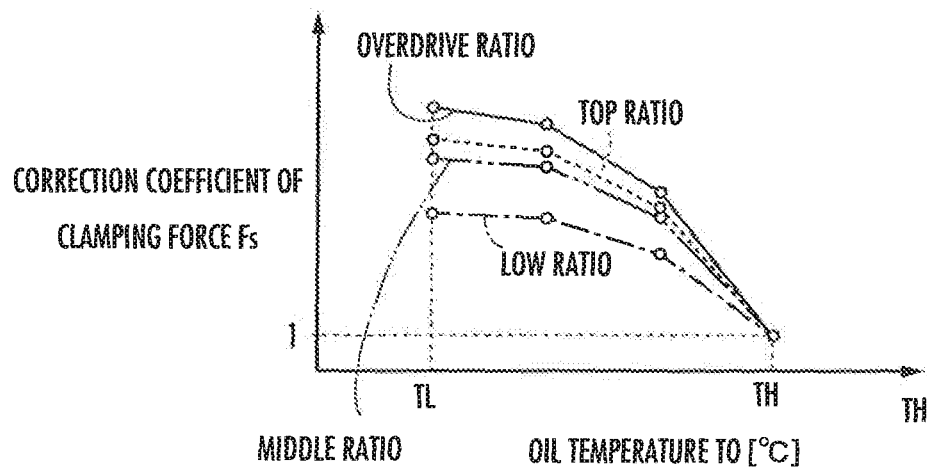
FIG. 4B is a diagram illustrating the relationship between the oil temperature and the correction coefficient of the clamping force in the case where the oil having the property illustrated in FIGS. 3A to 3C is used.

The correction described above is substantially equivalent to correcting the clamping force Fs, which has been determined by the clamping force determination unit 71, by multiplication by a correction coefficient. This correction coefficient is determined with respect to the oil temperature TO and the transmission gear ratio R as illustrated in FIG. 4B. In FIG. 4B, the horizontal axis represents the oil temperature TO (higher toward the right), and the vertical axis represents the correction coefficient of the clamping force Fs (larger toward the top). Thus, the clamping force Fs is corrected by a larger amount (that is, the correction coefficient for correcting the clamping force Fs is larger) when the oil temperature TO is lower, and also the clamping force Fs is corrected by a larger amount (that is, the correction coefficient for correcting the clamping force Fs is larger) when the transmission gear ratio R is smaller (the transmission gear ratio R is closer to the overdrive ratio).

In the case where the oil having the property illustrated in FIGS. 3A to 3C is used, the transmission section friction coefficient μ is low when the oil temperature TO is low. To ensure sufficient power transmission efficiency from the input-side pulleys 23 to the output-side pulleys 24 in such a case, the friction correction coefficient C (or the correction coefficient of the clamping force Fs) is determined using the oil temperature measured at the position expected to be low in temperature, i.e. the pre-supply oil temperature TOL detected by the low oil temperature detection unit 721.

By using the pre-supply oil temperature TOL detected by the low oil temperature sensor 341 in this way, the transmission section friction coefficient μ of the oil before being warmed by friction between each of the input-side pulleys 23 and the output-side pulleys 24 and the belt 55 can be estimated accurately. This ensures sufficient power transmission efficiency from the input-side pulleys 23 to the output-side pulleys 24, even in the case where the transmission section friction coefficient μ decreases when the oil temperature TO is low as illustrated in FIGS. 3A to 3C.

The oil used as the lubricant is not limited to the property in which the transmission section friction coefficient μ decreases as the oil temperature TO decreases as in the first property, or the property in which the transmission section friction coefficient μ is a minimum value when the oil temperature TO is the third temperature TM and increases slightly when the oil temperature TO decreases from the third temperature TM to the second temperature TL (the increase is small as compared with the increase of the transmission section friction coefficient μ when the oil temperature TO increases from the third temperature TM to the first temperature TH) as in the second property.

For example, oil having a property (hereafter referred to as "fourth property") in which the transmission section friction coefficient μ is a minimum value when the oil temperature TO is a predetermined temperature (hereafter referred to as "fourth temperature", which corresponds to the predetermined temperature in the present invention) T4, and the transmission section friction coefficient μ increases as the oil temperature TO increases from the fourth temperature T4 to the first temperature TH, and also increases as the oil temperature TO decreases from the fourth temperature T4 to the second temperature TL in the same manner as when the oil temperature TO increases from the fourth temperature T4 to the first temperature TH, as illustrated in FIGS. 5A to 5C.

The following describes the case of using the oil having the fourth property. The oil used in this embodiment is the oil having the fourth property.

In the case where this oil is used as the lubricant, when the transmission gear ratio R of the stepless transmission 11 is the overdrive ratio, the transmission section friction coefficient μ at the fourth temperature T4 is d2[%] lower than at the first temperature TH, and d1[%] lower than at the second temperature TL (see FIG. 5A). When the transmission gear ratio R of the stepless transmission 11 is the middle ratio, the transmission section friction coefficient μ at the fourth temperature T4 is e2[%] lower than at the first temperature TH, and e1[%] lower than at the second temperature TL (see FIG. 5B).

When the transmission gear ratio R of the stepless transmission 11 is the low ratio, the transmission section friction coefficient μ at the fourth temperature T4 is f2[%] lower than at the first temperature TH, and f1[%] lower than at the second temperature TL (see FIG. 5C). Here, d2>e2>f2, and d1>e1>f1.

Thus, in the case where the oil having the fourth property is used, the friction coefficient change rate is lower when the transmission gear ratio R is larger (overdrive ratio→middle ratio→low ratio). In the case where the oil having the fourth property is used, too, the amount of correction needs to be larger so that the clamping force Fs is larger when the friction coefficient change rate is higher as mentioned above, in order to prevent a decrease in power transmission efficiency from the input-side pulleys 23 to the output-side pulleys 24.

Figure 6A:
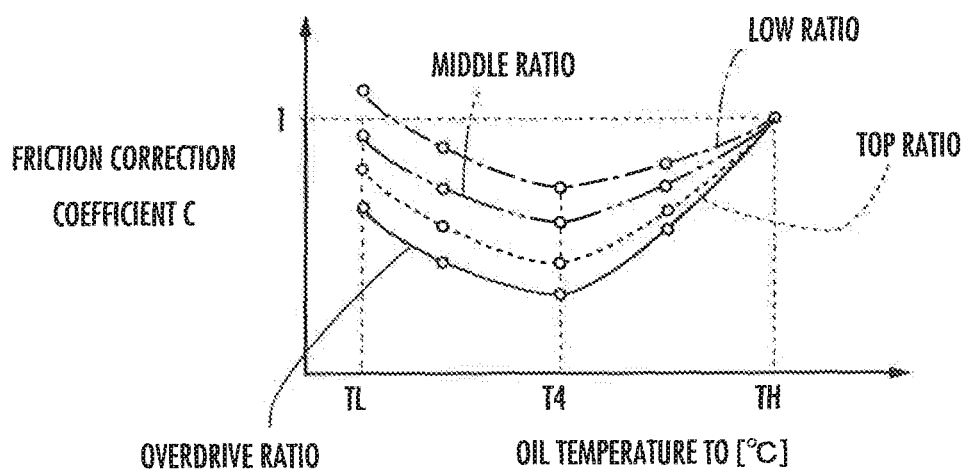
FIG. 6A is a diagram illustrating the relationship between the oil temperature and the friction correction coefficient when the transmission gear ratio of the stepless transmission is the overdrive ratio, the top ratio, the middle ratio, and the low ratio in the case where the oil having the property illustrated in FIGS. 5A to 5C is used.

In detail, a smaller friction correction coefficient C (the friction correction coefficient C is a coefficient for correcting the transmission section friction coefficient μ) is set when the transmission section friction coefficient μ corresponding to the oil temperature TO and the transmission gear ratio R is smaller (see FIG. 6A). FIG. 6A illustrates an example of the relationship between the oil temperature TO and the friction correction coefficient C. In FIG. 6A, the horizontal axis represents the oil temperature TO (higher toward the right), and the vertical axis represents the friction correction coefficient C (larger toward the top). The oil temperature friction property of the oil when the transmission gear ratio R is the top ratio is the fourth property, too, though not illustrated.

In each transmission gear ratio R, the friction correction coefficient C corresponding to the first temperature TH is set to "1" (that is, the first temperature TH is a reference temperature). Note that the reference temperature may be set to any temperature as appropriate. As illustrated in FIG. 6A, in each transmission gear ratio R, the friction correction coefficient C is a minimum value at the fourth temperature T4, and increases as the oil temperature TO changes away from the fourth temperature T4. Moreover, the friction correction coefficient C at the fourth temperature T4 is smaller when the transmission gear ratio R is smaller (the transmission gear ratio R is closer to the overdrive ratio). Hence, the friction correction coefficient C is smallest (i.e. the clamping force Fs is corrected by a largest amount as mentioned above) when the transmission gear ratio R is the overdrive ratio and the oil temperature TO is the fourth temperature T4.

Figure 6B:
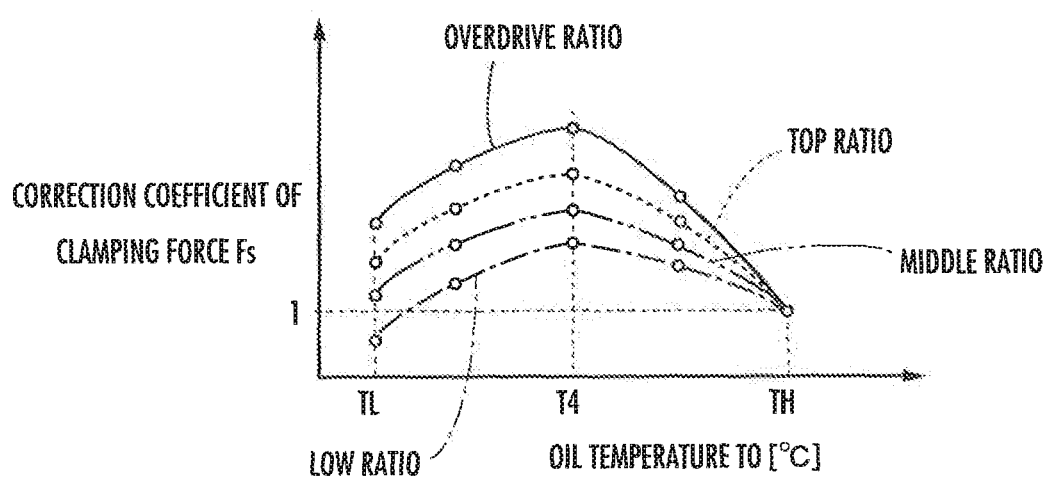
FIG. 6B is a diagram illustrating the relationship between the oil temperature and the correction coefficient of the clamping force in the case where the oil having the property illustrated in FIGS. 5A to 5C is used.

The relationship between the oil temperature TO and the friction correction coefficient C illustrated in FIG. 6A is substantially equivalent to the relationship between the oil temperature TO and the correction coefficient of the clamping force Fs illustrated in FIG. 6B. In detail, in each transmission gear ratio R, the correction coefficient of the clamping force Fs is a maximum value at the fourth temperature T4, and decreases as the oil temperature TO changes away from the fourth temperature T4. Moreover, the correction coefficient of the clamping force Fs at the fourth temperature T4 is larger when the transmission gear ratio R is smaller (the transmission gear ratio R is closer to the overdrive ratio). Hence, the correction coefficient of the clamping force Fs is largest when the transmission gear ratio R is the overdrive ratio and the oil temperature TO is the fourth temperature T4.

The following describes the control process executed by the control device 3, with reference to FIG. 7. The control process illustrated in FIG. 7 is executed at predetermined time intervals (e.g. 10 msec).

In first step ST1, the control device 3 determines the clamping force Fs from the target transmission gear ratio (corresponding to the process of the clamping force determination unit 71). Next, in step ST2, the control device 3 detects the current pre-supply oil temperature TOL from the output of the low oil temperature sensor 341, and detects the current drain oil temperature TOH from the output of the high oil temperature sensor 342 (corresponding to the process of the low oil temperature detection unit 721 and high oil temperature detection unit 722).

Next, in step ST3, the control device 3 detects the result of dividing the output of the input-side speed sensor 37 by the output of the output-side speed sensor 38, as the current actual transmission gear ratio R of the stepless transmission 11 (corresponding to the process of the transmission gear ratio detection unit 73).

Next, in step ST4, the control device 3 corrects the clamping force Fs determined in step ST1, based on the pre-supply oil temperature TOL and drain oil temperature TOH detected in step ST2 and the transmission gear ratio R detected in step ST3 (corresponding to the process of the correction unit 74). The process of step ST4 will be described in detail later, with reference to FIG. 8.

Next, in step ST5, the control device 3 controls the input-side oil pressure adjustment device 25 and the output-side oil pressure adjustment device 26 so that the force with which the input-side pulleys 23 clamp the belt 55 and the force with which the output-side pulleys 24 clamp the belt 55 are the new clamping force Fs determined in step ST4 (corresponding to the process of the clamping force control unit 75).

The following describes the process of step ST4 (the process of correcting the clamping force Fs) in detail.

In this process, the control device 3 corrects the clamping force Fs using the pre-supply oil temperature TOL in the case where the estimated oil temperature TOD of the lubricant is likely to be higher than the fourth temperature T4, and corrects the clamping force Fs using the drain oil temperature TOH in the case where the estimated oil temperature TOD of the lubricant is likely to be lower than the fourth temperature T4.

Thus, the control device 3 uses the temperature (TOL or TOH) closer to the fourth temperature T4 at which the transmission section friction coefficient μ decreases, as the lubricant temperature TO used to correct the clamping force Fs. This enables efficient power transmission from the input-side pulleys 23 to the output-side pulleys 24.

The process of step ST4 is described in detail below, with reference to FIG. 8. In first step ST11 in FIG. 8, the control device 3 determines whether or not the oil temperature is currently increasing. Various methods of determining whether or not the oil temperature is increasing are available. For example, the control device 3 may determine that the oil temperature is increasing, when a predetermined value determined based on at least one of the pre-supply oil temperature TOL and the drain oil temperature TOH is increasing.

The predetermined value used here may be set to any of: the pre-supply oil temperature TOL; the drain oil temperature TOH; an average value of the two oil temperatures TOL and TOH; and a value between the two oil temperatures TOL and TOH (e.g. the estimated oil temperature TOD of the oil when functioning as the lubricant, where the method of determining (estimating) the value is set through various experiments). The predetermined value may be set to a value other than the above-mentioned values.

In the case of determining that the oil temperature is increasing, the control device 3 advances to step ST12, and determines whether or not the drain oil temperature TOH detected by the high oil temperature detection unit 722 is higher than or equal to the fourth temperature T4 (TOH≥T4). In the case where the determination result is TOH≥T4, the control device 3 advances to step ST13. In step ST13, the control device 3 obtains the friction correction coefficient C from the map as illustrated in FIG. 6A using the current transmission gear ratio R and pre-supply oil temperature TOL (the value TOL is regarded as the oil temperature TO), and corrects the clamping force Fs determined in step ST1 (see FIG. 7) to obtain the new clamping force as described above.

In the case where the determination result in step ST12 is TOH<T4, the control device 3 advances to step ST14. In step ST14, the control device 3 obtains the friction correction coefficient C from the map as illustrated in FIG. 6A using the current transmission gear ratio R and drain oil temperature TOH (the value TOH is regarded as the oil temperature TO), and corrects the clamping force Fs determined in step ST1 (see FIG. 7) to obtain the new clamping force as described above.

In the case of determining that the oil temperature is not increasing in step ST11, the control device 3 advances to step ST15. In step ST15, the control device 3 determines whether or not the pre-supply oil temperature TOL is higher than or equal to the fourth temperature T4 (TOL≥T4). In the case where the determination result is TOL≥T4, the control device 3 advances to the above-mentioned step ST13. In the case where the determination result in step ST15 is TOL<T4, the control device 3 advances to the above-mentioned step ST14.

Figure 8:
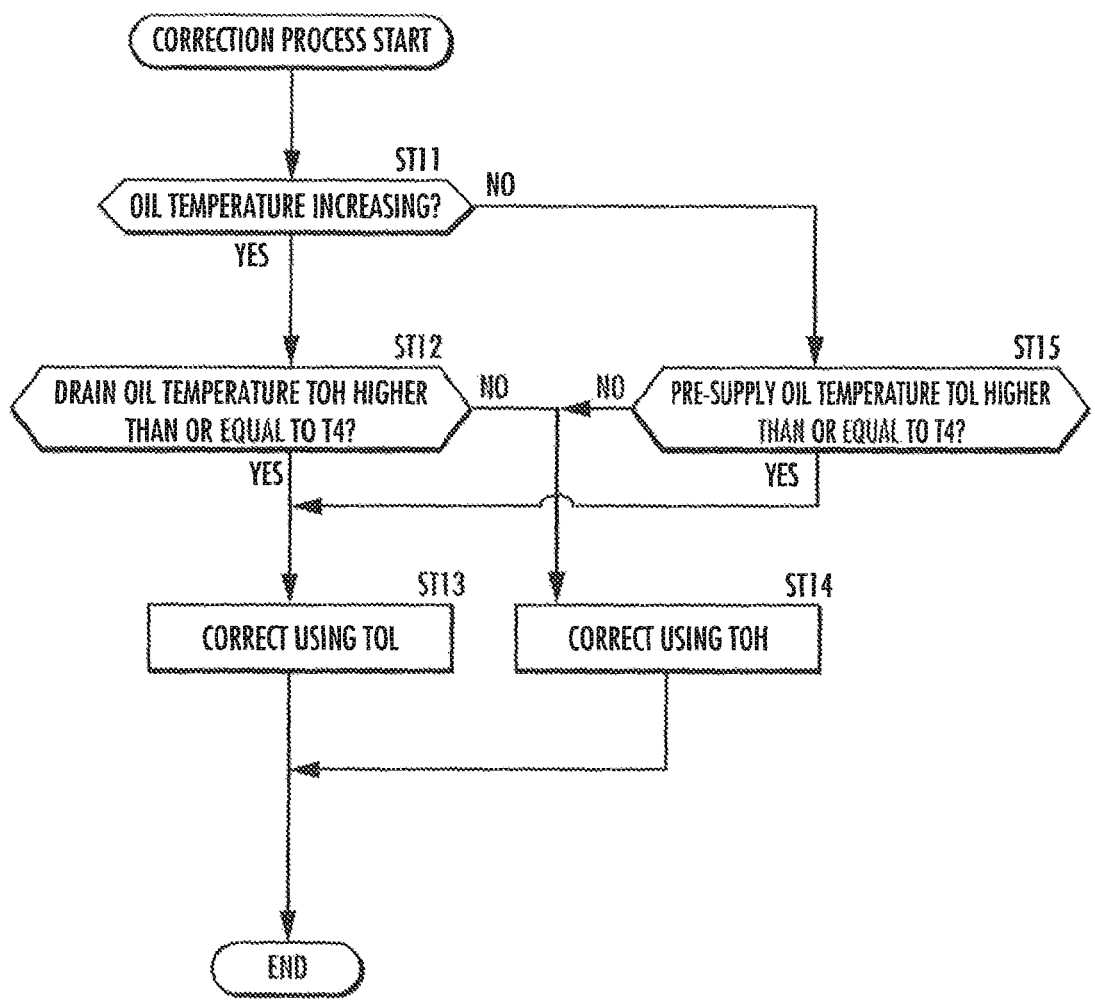
FIG. 8 is a flowchart illustrating the process of step ST4 in FIG. 7 in detail.

Having completed the process of step ST13 or ST14, the control device 3 ends the process in FIG. 8.

Here, the state in which the oil temperature is increasing (the determination result in step ST11 is YES) and TOH≥T4 (the determination result in step ST12 is YES) is referred to as "first state". The state in which the oil temperature is not increasing (the determination result in step ST11 is NO) and TOL≥T4 (the determination result in step ST15 is YES) is referred to as "second state". The state in which the oil temperature is increasing (the determination result in step ST11 is YES) and TOH<T4 (the determination result in step ST12 is NO) is referred to as "third state". The state in which the oil temperature is not increasing (the determination result in step ST11 is NO) and TOL<T4 (the determination result in step ST15 is NO) is referred to as "fourth state".

According to the process in FIG. 8 described above, the control device 3 corrects the clamping force Fs using the pre-supply oil temperature TOL in the first state or the second state, and corrects the clamping force Fs using the drain oil temperature TOH in the third state or the fourth state.

The first state is a state in which the drain oil temperature TOH is higher than or equal to the fourth temperature T4 and the oil temperature is increasing. Accordingly, in the case where the pre-supply oil temperature TOL is lower than the fourth temperature T4 in the first state, the pre-supply oil temperature TOL is close to the fourth temperature T4, that is, close to the state in which the transmission section friction coefficient μ is lowest. In such a case, the control device 3 corrects the clamping force Fs using the pre-supply oil temperature TOL close to the state in which the transmission section friction coefficient μ is lowest. This enables efficient power transmission from the input-side pulleys 23 to the output-side pulleys 24.

Meanwhile, in the case where the pre-supply oil temperature TOL is higher than or equal to the fourth temperature T4 in the first state, the temperature shifts to the state in which the transmission section friction coefficient μ is higher due to an increase in oil temperature. The control device 3 accordingly corrects the clamping force Fs using the pre-supply oil temperature TOL closer to the fourth temperature T4 than the drain oil temperature TOH. This enables efficient power transmission from the input-side pulleys 23 to the output-side pulleys 24.

Thus, the first state is a state in which the estimated oil temperature TOD of the lubricant is likely to be higher than the fourth temperature T4 (including not only the state in which TOD≥T4 is currently satisfied but also the state in which, though TOD≥T4 is not currently satisfied, TOD≥T4 will be satisfied soon given that the oil temperature is increasing).

The second state is a state in which the pre-supply oil temperature TOL is higher than or equal to the fourth temperature T4, and accordingly the control device 3 corrects the clamping force Fs using the pre-supply oil temperature TOL closer to the fourth temperature T4 than the drain oil temperature TOH. This enables efficient power transmission from the input-side pulleys 23 to the output-side pulleys 24. Thus, the second state is a state in which the estimated oil temperature TOD of the lubricant is likely to be higher than the fourth temperature T4.

The third state is a state in which the drain oil temperature TOH is lower than the fourth temperature T4, and accordingly the control device 3 corrects the clamping force Fs using the drain oil temperature TOH closer to the fourth temperature T4 than the pre-supply oil temperature TOL. This enables efficient power transmission from the input-side pulleys 23 to the output-side pulleys 24. Thus, the third state is a state in which the estimated oil temperature TOD of the lubricant is likely to be lower than the fourth temperature T4.

The fourth state is a state in which the pre-supply oil temperature TOL is lower than the fourth temperature T4 and the oil temperature is not increasing. Accordingly, in the case where the drain oil temperature TOH is higher than or equal to the fourth temperature T4 in the fourth state, the drain oil temperature TOH is close to the fourth temperature T4, that is, close to the state in which the transmission section friction coefficient μ is lowest. In such a case, the control device 3 corrects the clamping force Fs using the drain oil temperature TOH close to the state in which the transmission section friction coefficient μ is lowest. This enables efficient power transmission from the input-side pulleys 23 to the output-side pulleys 24.

Meanwhile, in the case where the drain oil temperature TOH is lower than the fourth temperature T4 in the fourth state, the temperature shifts to the state in which the transmission section friction coefficient μ is higher due to a decrease in oil temperature. The control device 3 accordingly corrects the clamping force Fs using the drain oil temperature TOH closer to the fourth temperature T4 than the pre-supply oil temperature TOL. This enables efficient power transmission from the input-side pulleys 23 to the output-side pulleys 24.

Thus, the fourth state is a state in which the estimated oil temperature TOD of the lubricant is likely to be lower than the fourth temperature T4 (including the state in which, though TOD<T4 is not currently satisfied, TOD<T4 will be satisfied soon due to a decrease in oil temperature given that the oil temperature is not increasing).

In this way, the temperature to be compared with the fourth temperature T4 is switched between the drain oil temperature TOH and the pre-supply oil temperature TOL depending on whether or not the oil temperature is increasing in step ST11. This corresponds to the process of the lubricant temperature estimation unit 723 in the present invention. In detail, the drain oil temperature TOH is the estimated oil temperature TOD in step ST12, and the pre-supply oil temperature TOL is the estimated oil temperature TOD in step ST15.

With such use of the temperature closer to the fourth temperature T4 as the temperature TOD of the lubricant, the clamping force Fs sufficient for the transmission section friction coefficient μ can be obtained by correction, in order to prevent a decrease in power transmission efficiency.

Although the lubricant temperature estimation unit 723 determines the temperature TOD of the lubricant in the above-mentioned way in this embodiment, the lubricant temperature estimation unit 723 may, for example, estimate a temperature (e.g. an average value or the like, where the method of determining the temperature is set through various experiments) between the pre-supply oil temperature TOL and the drain oil temperature TOH, as the temperature (hereafter referred to as "estimated oil temperature") TOD of the oil when functioning as the lubricant.

Although the correction unit corrects the clamping force Fs based on the temperature TO detected by the temperature detection unit 721, 722 and the transmission gear ratio R detected by the transmission gear ratio detection unit 73 in this embodiment, this is not a limitation. The correction unit may correct the clamping force Fs based on the temperature TO detected by the temperature detection unit 721, 722, without taking the transmission gear ratio R into consideration.

Although the first oil temperature detection unit and the second oil temperature detection unit use two temperature sensors, namely, the temperature sensor for measuring the pre-supply oil temperature and the temperature sensor for measuring the drain oil temperature, in this embodiment, one oil temperature detection unit may detect one oil temperature using one temperature sensor whereas the other oil temperature detection unit may estimate or calculate the other undetected oil temperature. For example, the other oil temperature detection unit estimates the friction heat generated between each of the input-side element and the output-side element and the transmission element based on the torque transmitted from the input-side element to the output-side element, the detected oil temperature, etc., and estimates or calculates the other oil temperature according to the estimated friction heat. The term "detection" in the present invention thus means obtaining the detection result of the detection object by measurement using a sensor or the like, calculation from the measurement result, estimation from the measurement result, or the like.

Although the stepless transmission in this embodiment is a belt-type stepless transmission in which power is transmitted from the input-side element to the output-side element with the belt as the transmission element, the stepless transmission may be a toroidal stepless transmission.

INDUSTRIAL APPLICABILITY

As described above, the control device for the stepless transmission according to the present invention enables efficient power transmission from the input-side element to the output-side element, and so is effective in providing energy-efficient stepless transmissions.

DESCRIPTION OF REFERENCE NUMERALS 1 vehicle
3 control device
7 engine (power source)
11 stepless transmission
14 drive wheel
23 input-side pulley (input-side element)
24 output-side pulley (output-side element)
341 low oil temperature sensor
342 high oil temperature sensor
37 input-side speed sensor
38 output-side speed sensor
55 belt (transmission element)
Fs clamping force
R transmission gear ratio
TO oil temperature
71 clamping force determination unit
721 low oil temperature detection unit (first oil temperature detection unit)
722 high oil temperature detection unit (second oil temperature detection
72 unit)
723 lubricant temperature estimation unit
73 transmission gear ratio detection unit
74 correction unit
75 clamping force control unit

The invention claimed is:

1. A control device for a stepless transmission that includes: an input-side element configured to receive power from a power source of a vehicle; an output-side element configured to output the power to a drive wheel of the vehicle; and a transmission element configured to transmit the power from the input-side element to the output-side element, wherein the power is transmitted between each of the input-side element and the output-side element and the transmission element with a lubricant being interposed between each of the input-side element and the output-side element and the transmission element, and a transmission gear ratio is adjusted according to a clamping force of the input-side element and the output-side element for the transmission element, the control device comprising:
   a clamping force determination unit configured to determine the clamping force so that the transmission gear ratio of the stepless transmission is a target transmission gear ratio which is a target value of the stepless transmission;
   a first oil temperature detection unit configured to detect a temperature of oil before being supplied as the lubricant;
   a second oil temperature detection unit configured to detect the temperature of the oil that has been supplied as the lubricant and discharged from between each of the input-side element and the output-side element and the transmission element;
   a lubricant temperature estimation unit configured to estimate a temperature of the lubricant, based on at least one of the temperature detected by the first oil temperature detection unit and the temperature detected by the second oil temperature detection unit;
   a correction unit configured to correct the clamping force determined by the clamping force determination unit, based on the temperature detected by the first oil temperature detection unit, the temperature detected by the second oil temperature detection unit, and the temperature estimated by the lubricant temperature estimation unit; and
   a clamping force control unit configured to control clamping of the input-side element and the output-side element to be performed with the clamping force corrected by the correction unit,
   wherein the lubricant has a property in which a friction coefficient between each of the input-side element and the output-side element and the transmission element is lower when the temperature of the lubricant is closer to a predetermined temperature, and
   wherein the correction unit is configured to correct the clamping force based on the temperature detected by the second oil temperature detection unit in the case where the temperature estimated by the lubricant temperature estimation unit is lower than the predetermined temperature, and correct the clamping force based on the temperature detected by the first oil temperature detection unit in the case where the temperature estimated by the lubricant temperature estimation unit is higher than the predetermined temperature.

2. The control device for a stepless transmission according to claim 1, wherein the correction unit is configured to correct the clamping force to be larger when the temperature based on which the clamping force is corrected is closer to the predetermined temperature.

3. The control device for a stepless transmission according to claim 1, comprising
   a transmission gear ratio detection unit configured to detect the transmission gear ratio of the stepless transmission,
   wherein the correction unit is configured to correct the clamping force to be larger when the transmission gear ratio detected by the transmission gear ratio detection unit is smaller.

4. The control device for a stepless transmission according to claim 2, comprising a transmission gear ratio detection unit configured to detect the transmission gear ratio of the stepless transmission, wherein the correction unit is configured to correct the clamping force to be larger when the transmission gear ratio detected by the transmission gear ratio detection unit is smaller.

\* \* \* \* \*